United States Patent [19]

Kunert

[11] Patent Number: 5,085,021
[45] Date of Patent: Feb. 4, 1992

[54] AUTOMOBILE GLASS PANE HAVING ELASTIC SEALING PROFILE

[75] Inventor: Heinz Kunert, Cologne, Fed. Rep. of Germany

[73] Assignee: Saint-Gobain Vitrage, Courbevoie, France

[21] Appl. No.: 314,302

[22] Filed: Feb. 23, 1989

Related U.S. Application Data

[63] Continuation of Ser. No. 84,867, Aug. 13, 1987, abandoned.

[30] Foreign Application Priority Data

Aug. 13, 1986 [DE] Fed. Rep. of Germany ....... 3627537

[51] Int. Cl.⁵ .............................. E06B 3/62; B60J 1/00; B60J 10/02
[52] U.S. Cl. ......................................... 52/208; 52/397; 296/84.1; 296/93; 296/201
[58] Field of Search .................. 52/208, 397, 400; 49/485, 489; 296/93, 84 A, 84 R, 84 D, 201; 428/34

[56] References Cited

U.S. PATENT DOCUMENTS

| | | | |
|---|---|---|---|
| 2,969,252 | 1/1961 | Gruver | 49/489 |
| 3,037,810 | 6/1962 | Kelley | 52/208 |
| 3,061,895 | 11/1962 | Kleinhans | 52/400 |
| 3,387,416 | 6/1968 | Martin | 52/397 |
| 3,779,794 | 12/1973 | De Santis | 156/329 |
| 3,882,637 | 5/1975 | Lindenschmidt | 49/489 |
| 4,139,234 | 2/1979 | Morgan | 52/208 |
| 4,357,187 | 11/1982 | Stanley et al. | 428/34 |
| 4,364,214 | 12/1982 | Morgan et al. | 52/311 |
| 4,396,223 | 8/1983 | Drexel et al. | 52/397 |
| 4,551,372 | 11/1985 | Kunert | 52/789 |
| 4,571,278 | 2/1986 | Kunert | 52/208 |
| 4,581,865 | 4/1986 | Miller | 52/202 |
| 4,606,159 | 8/1986 | Kunert | 52/400 |
| 4,648,221 | 3/1987 | Haggqvist | 52/202 |
| 4,700,525 | 10/1987 | Nieboer et al. | 52/397 |
| 4,703,973 | 11/1987 | Fujikawa | 296/201 |

FOREIGN PATENT DOCUMENTS

| | | | |
|---|---|---|---|
| 2103880 | 8/1971 | Fed. Rep. of Germany | 49/485 |
| 2543533 | 10/1984 | France . | |
| 166517 | 8/1985 | Japan | 52/400 |

Primary Examiner—Michael Safavi
Attorney, Agent, or Firm—Oblon, Spivak, McClelland, Maier & Neustadt

[57] ABSTRACT

A glass pane is equipped with an elastically resilient sealing profile. For fixing the sealing profile on the glass pane, a profile strand is glued to the glass pane and a sealing profile is secured to this strand. The profile strand consists of a hardened adhesive compound extruded directly onto the glass pane or onto a frame-like coating disposed on the glass pane. The profile strand has a channel-shaped cross-section and possesses lateral flanges which are equipped with inwardly oriented projections and thus form an insertion groove with back-cut zones for securing a push-in portion connected with the sealing portion of the sealing profile.

5 Claims, 2 Drawing Sheets

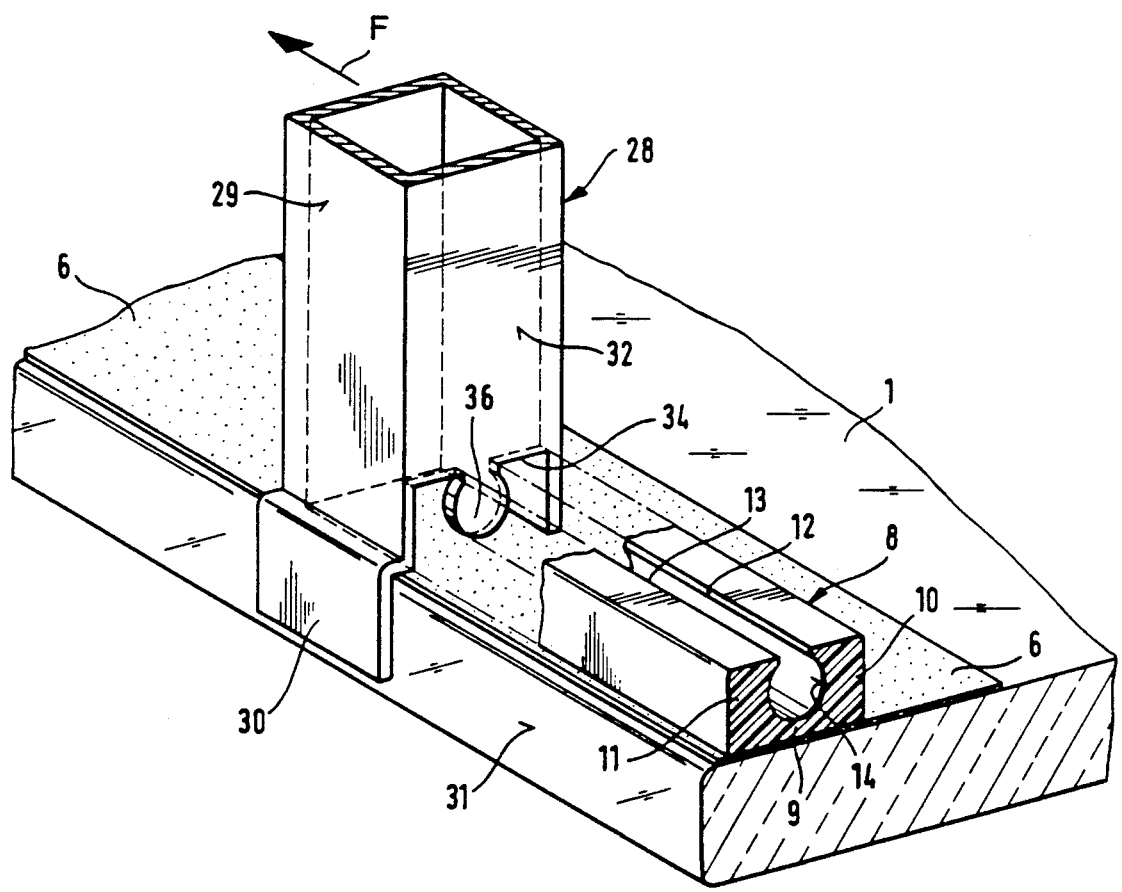

AUTOMOBILE GLASS PANE HAVING ELASTIC SEALING PROFILE

This application is a continuation of application Ser. No. 084,867, filed on Aug. 13, 1987, now abandoned.

BACKGROUND OF THE INVENTION

1. Field of the Invention

This invention relates to a glass pane equipped with an elastic sealing profile, especially an automobile glass pane, wherein the elastic sealing profile is secured in the insertion groove of a profile strand firmly bonded with the glass pane. Glass panes of this type can be used both for pivoting windows which may be opened and as glass panes fixed in the window frame, wherein the sealing of the glass pane is carried out by pressing an elastically deformable sealing profile onto the window frame. They find applications both in building construction and in the automobile sector.

2. Background of the Related Art

In known glass panes of this type, the profile strand possessing the insertion groove for the sealing profile is bonded, in the form of a metal profile strip or a frame profile of plastic, to the glass pane by means of an adhesive coating. In the bonding of the profile strand to the glass pane, however, problems can arise because the profile strand, which of necessity possesses certain restoring forces due to its elastic properties, must be fixed to the glass pane by mechanical aids until the adhesive compound is hardened. In a continuous manufacturing process, such a measure is a nuisance.

In another known arrangement, the profile possessing the insertion groove is applied onto the edge zone of the glass pane by injection moulding method. A disadvantage here is that a special injection mould must be made for each form of pane, which is expensive for larger glass panes.

SUMMARY OF THE INVENTION

The object of the present invention is to create a glass pane of the aforementioned type, in which the aforementioned disadvantages do not occur. In particular, the glass pane should be suitable for automatic production and inexpensive to make.

The invention consists of the profile strand being firmly bonded to the glass pane by a hardened adhesive compound forming a permanent bond with the glass pane or with a coating disposed on the glass pane, and made by extrusion via a profiled extruder nozzle directly onto the glass pane or onto the coating disposed on the glass pane.

According to the invention, use is made of a known extrusion technique, as is known for the application of a profiled adhesive strand, for example from DE-OS 34 09 960 and DE-OS 34 09 903. By means of this technique, clamping profiles having a defined cross-section and specific elastic properties are applied onto the glass pane. Very widely varying shapes and sizes of glass pane can, without difficulty, be equipped with such a profile without substantial changes or adaptations to the manufacturing plant being necessary. It is, indeed, only necessary to adapt any control program for the movement control of the extrusion nozzle, which is guided over the edge zone of the glass pane, to the glass pane to be equipped with the profile strand, but this can be done without difficulty and virtually without loss of time due to modification of the plant.

After the hardening of the clamping profile strand, which can take place in a relatively short time, the elastic sealing profile can be secured on or in the profile strand by clamping action, that is to say by form-fitting and force-transmitting connection to the insertion groove or, for example, by glueing.

In one especially favorable further embodiment of the invention the profile strand produced by extrusion has a channel-shaped cross-section, open on the side remote from the glass surface, the lateral flanges of the profile strand being equipped with inwardly orientated projections, thus forming an insertion groove with back-cut zones. The fixing of the push-in sealing profile in the insertion groove of the profile strand may be effected either exclusively by force-transmitting and form-fitting connection, or optionally also with the incorporation of an additional adhesive coating.

In a further embodiment of the invention, the cross-section of the profile strand may be so shaped that it makes possible the clamping fixing of correspondingly shaped fixing clips of metal, these fixing clips being equipped with fixing bolts for a screwed or clamped connection with the fixing web of the window frame.

BRIEF DESCRIPTION OF THE DRAWINGS

FIG. 3 is an extruder nozzle for extruding the profile strand directly onto the glass pane.

DETAILED DESCRIPTION OF THE PREFERRED EMBODIMENTS

Figure 1:
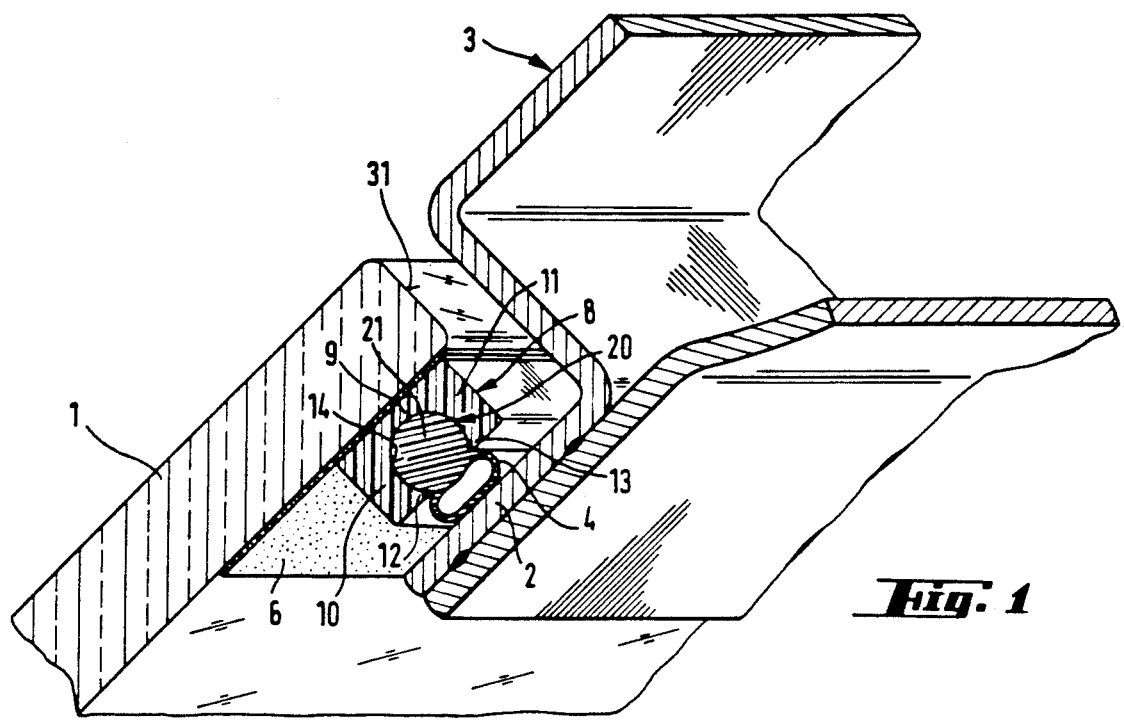
FIG. 1 is an edge portion of a pivotal automobile window in the closed position.

The glass panes of this invention can be any glass panes, including glass panes as used in the building industry as well as glass panes which are provided for automobile glazing.

In the glass pane 1 described in the following embodiment there is a single-pane safety glass pane which is installed as a pivotal side window in an automobile body. For example, the glass pane 1 is attached at its front vertical edge to the automobile body by means of hinge connections (not shown) with the bodywork flange, and is pressed by a closing mechanism situated at the rear vertical edge onto the sealing flange 2 of the window frame 3 of the automobile body. The sealing of the glass pane 1 onto the sealing flange 2 is here effected by the tube-like sealing profile portion 4, which deforms elastically as compared to the portion 21 under the applied pressure, due to its tube like shape.

On the glass pane 1, a strip or frame 6 of an opaque coating is disposed along the edge of the pane. Usually, this frame 6 is of a ceramic baked-on lacquer. The profile strand 8 is glued to this frame-like coating. The profile strand 8 consists of a suitable extrudable adhesive compound, for example a moisture-hardening, single-component polyurethane or of a two-component reaction adhesive on the basis of polyurethane. It is extruded by means of a suitably profiled extruder nozzle with the desired cross-section, directly onto the glass pane or the frame-like coating 6, possibly after pretreatment of the glass pane or frame-like coating 6 by suitable cleaners and/or primers. Suitable compositions for adhesive systems which may be considered for the production of the profile strand and for the preparation of the frame-like coating 6 are described, for example, in U.S. Pat. No. 3,779,794.

The profile strand 8 has a substantially U-shaped cross-section, with a central web 9 and the two lateral flanges 10 and 11. The lateral flanges 10, 11 are equipped in their end regions with inwardly orientated, that is mutually facing, projections 12, 13. Beneath these projections 12, 13, the channel-shaped cavity 14 of the profile strand 8 diverges. This channel-shaped cavity 14, which in the illustrated embodiments can have a generally circular cross-section, constitutes the insertion groove for the elastic push-in sealing profile 20.

The sealing profile 20 has a tube-shaped portion 4 and a portion 21 having a cross-section corresponding to that of the channel-shaped cavity 14, e.g., an approximately circular section. The portion 21, which is pressed into the insertion groove formed by the channel-shaped cavity 14 and makes a form-fitting and force-transmitting connection with this cavity, preferably consists of a rigid material, i.e., an incompressible or only slightly compressible material.

The channel-shaped cavity 14, constituting the insertion groove, may of course have some other appropriate cross-section. It is necessary only that the profile strand 8 shall have projections 12, 13 which form back-cut zones, by which the push-in portion 21 of the sealing profile is form-fittingly securely held. Since the profile strand 8 also has a certain elastic deformability, the sealing profile 20 is held by an additional clamping force component.

Figure 2:
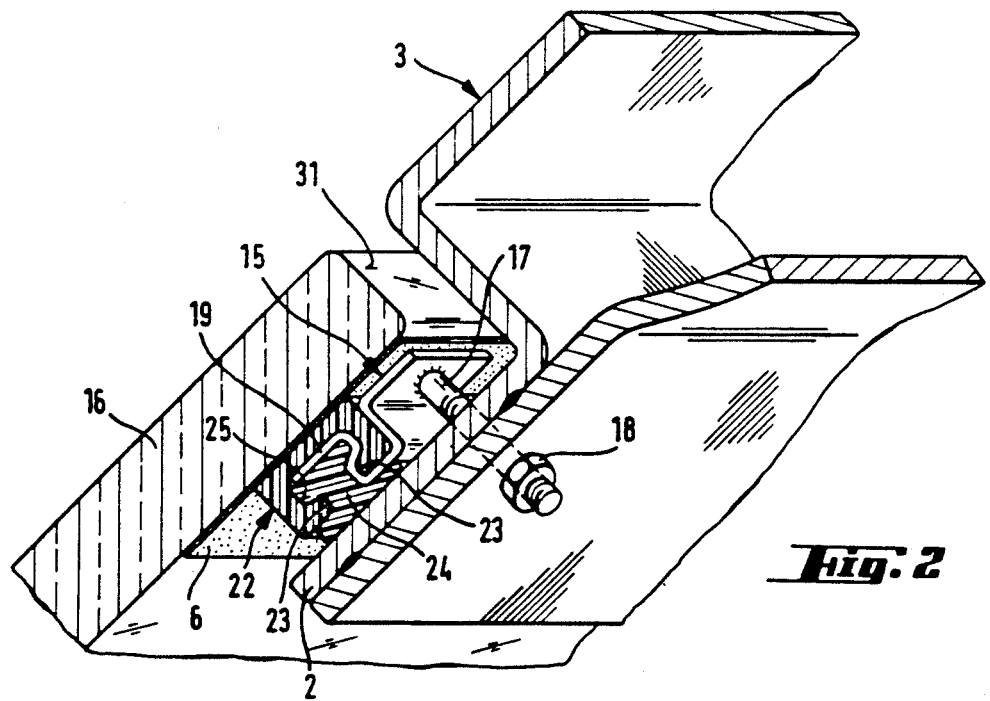
FIG. 2 is an edge portion of an automobile window bolted to the fixing web of a window frame.

In the case of the automobile window illustrated in FIG. 2, in contrast to the above described window, this is a window permanently built into the window frame. In this case, the fixing of the glass pane 16 to the fixing and sealing flange 2 of the window frame 3 is effected by means of threaded bolts 17 which are passed through corresponding holes in the fixing and sealing flange 2 and are firmly secured by nuts 18. The threaded bolts 17 are fixed, for example welded, to fixing clips 15. The fixing clips 15 have a crank end portion 19, shaped to correspond to the cross-section of the channel-shaped cavity 25 of the profile strand 22. The end portion 19 may, for example, have an S-shaped or a Z-shaped form, such that the fixing clips 15 can be held in position by one of the projections 23.

The sealing profile 24 can, for example, be of an elastically deformable rubber-like or foam rubber-like strand, which is laid in the channel-shaped cavity 25 of the profile strand 22. Under the pressure of the bolted connection 17, 18, the sealing profile 24 deforms, fills the channel-shaped cavity 25 and is pressed with corresponding deformation onto the sealing flange 2.

In FIG. 3, the process is illustrated by which the profile strand 8 or 22 is produced directly on the glass pane 1, 16, respectively, or on the frame-like coating 6. The profile strand is extruded with the desired cross-section onto the glass pane by means of an extruder nozzle 28. The extruder nozzle 28 is a pipe with open bottom and rectangular cross-section, which is placed onto the edge zone of the glass pane and moved along the edge of the glass pane in the direction of the arrow F. To facilitate guiding of the extruder nozzle, the wall 29 of the extruder nozzle 28 is continued downwards with a slight offset. The lengthened portion 30 of the wall 29 thus constitutes a bearing surface, which is pressed against the peripheral surface 31 of the glass pane 1 and in this manner facilitates the guidance of the nozzle along the periphery of the glass pane.

On the rear face of the extruder nozzle, as viewed in the direction of movement of the extruder nozzle, a recess 34 is formed at the lower end of the wall 32, this recess corresponding to the cross-section of the profile strand 8, 22, respectively. The projection 36 of the wall 32, penetrating into the recess 34, serves for producing the channel-shaped cavity 14, 25, respectively. The shape of this projection 36 corresponds to the cross-section of the channel-shaped cavity 14, 25, respectively. The adhesive compound which is to be extruded to form the profile strand 8 is pressed by means of known methods and apparatuses under the necessary pressure into the extruder nozzle 28, while the nozzle is moved at uniform speed along the edge of the glass pane.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle glass pane assembly for a vehicle having a window frame, comprising:
   a glass pane;
   a hardened profile strand comprising an extruded adhesive compound bonded to said glass pane and having an insertion groove, wherein said profile strand has a channel-shaped cross-section open opposite said glass pane at said insertion groove and includes projections oriented towards one another on opposite sides of said insertion groove; and
   an elastic sealing profile secured in said insertion groove, wherein said sealing profile comprises a rigid push-in portion form fitted in said insertion groove and a sealing portion projecting out from said profile strand and constructed so as to be elastically deformable as compared to said push-in portion, said sealing portion pressing on the window frame, whereby there results a force transmitting form fitting connection between the profile strand and the sealing profile and a seal between said sealing portion and the window frame due to the elasticity of said sealing portion.

2. The glass pane assembly of claim 1, including a coating disposed on said glass pane, said profile strand being bonded to said glass pane via said coating.

3. A glass pane assembly, comprising:
   a glass pane;
   a hardened profile strand comprising an extruded adhesive compound bonded to said glass pane and having an insertion groove, wherein said profile strand has a channel-shaped cross-section open opposite said glass pane at said insertion groove and includes projections oriented towards one another on opposite sides of said insertion groove; and
   an elastic sealing profile secured in said insertion groove, wherein said sealing profile comprises a rigid push-in portion form fitted in said insertion groove and an elastically deformable sealing portion projecting out from said profile strand, whereby there results a force transmitting, form fitting connection between the profile strand and the sealing profile,
   wherein said profile strand is formed of an extrudable, moisture-hardened, single component polyurethane composition.

4. A glass pane assembly, comprising:

a glass pane;

a hardened profile strand comprising an extruded adhesive compound bonded to said glass pane and having an insertion groove, wherein said profile strand has a channel-shaped cross-section open opposite said glass pane at said insertion groove and include projections oriented towards one another on opposite sides of said insertion groove; and an elastic sealing profile secured in said insertion groove, wherein said sealing profile comprises a rigid push-in portion form fitted in said insertion groove and an elastically deformable sealing portion projecting out from said profile strand, whereby there results a force transmitting, form fitting connection between the profile strand and the sealing profile, wherein said profile strand is formed of an extrudable, two component reaction adhesive having a polyurethane base.

5. A glass pane assembly, comprising:

a glass pane;

a hardened profile strand comprising an extruded adhesive compound bonded to said glass pane and having an insertion groove, wherein said profile strand has a channel-shaped cross-section open opposite said glass pane at said insertion groove and includes projections oriented towards one another on opposite sides of said insertion groove; and an elastic sealing profile secured in said insertion groove, wherein said sealing profile comprises a rigid push-in portion form fitted in said insertion groove and an elastically deformable sealing portion projecting out from said profile strand, whereby there results a force transmitting connection between the profile strand and the sealing profile, including a metal clip fitted in said insertion groove between said profile strand and said sealing profile and at least one fixing bolt fixed to said clip and fixable to a window frame.

* * * * *